May 12, 1964  R. H. WISE  3,132,367
WINDSHIELD WIPER
Filed April 24, 1959  3 Sheets-Sheet 2
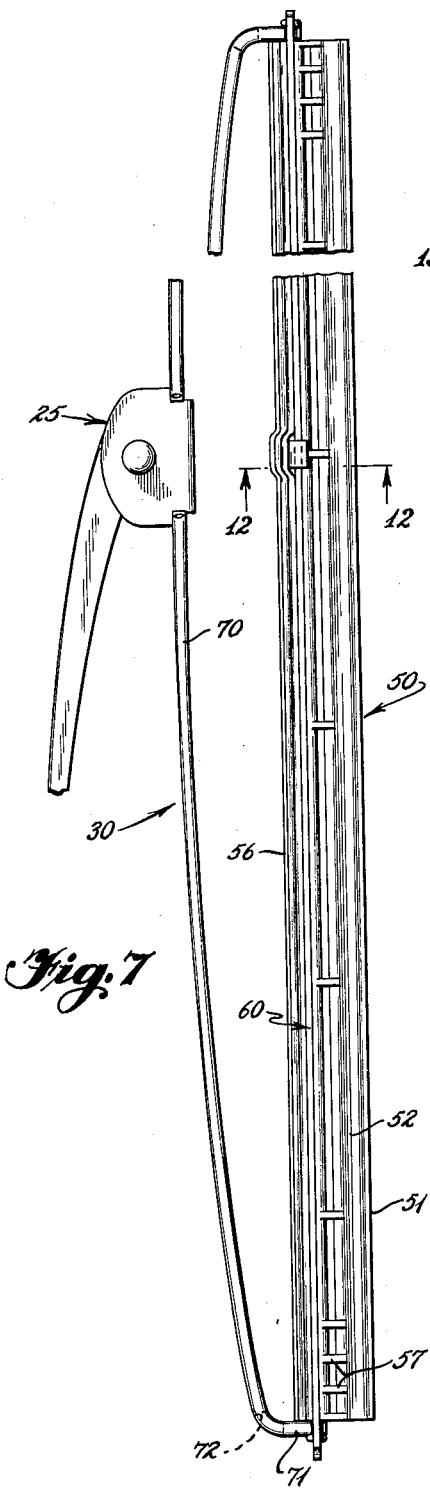
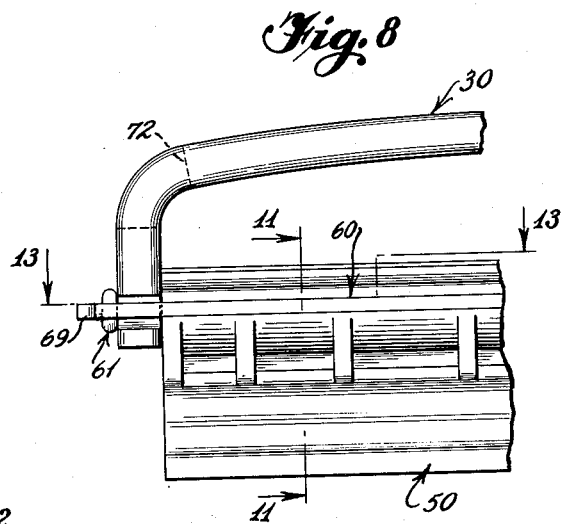
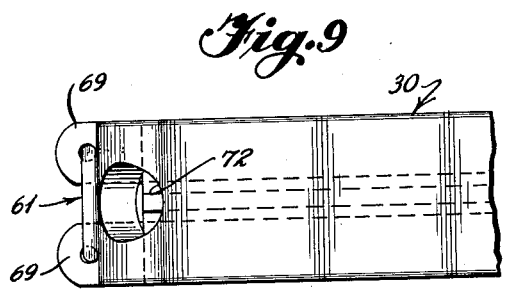
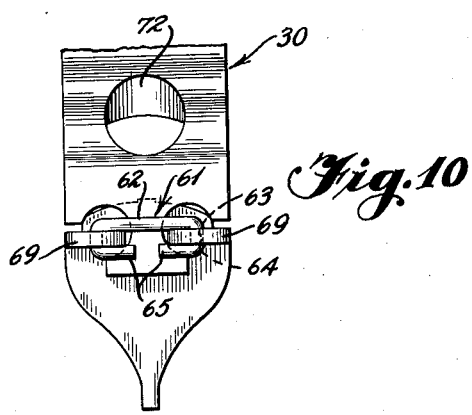
INVENTOR.
Ralph H. Wise
BY H. P. Settle, Jr.
ATTORNEY

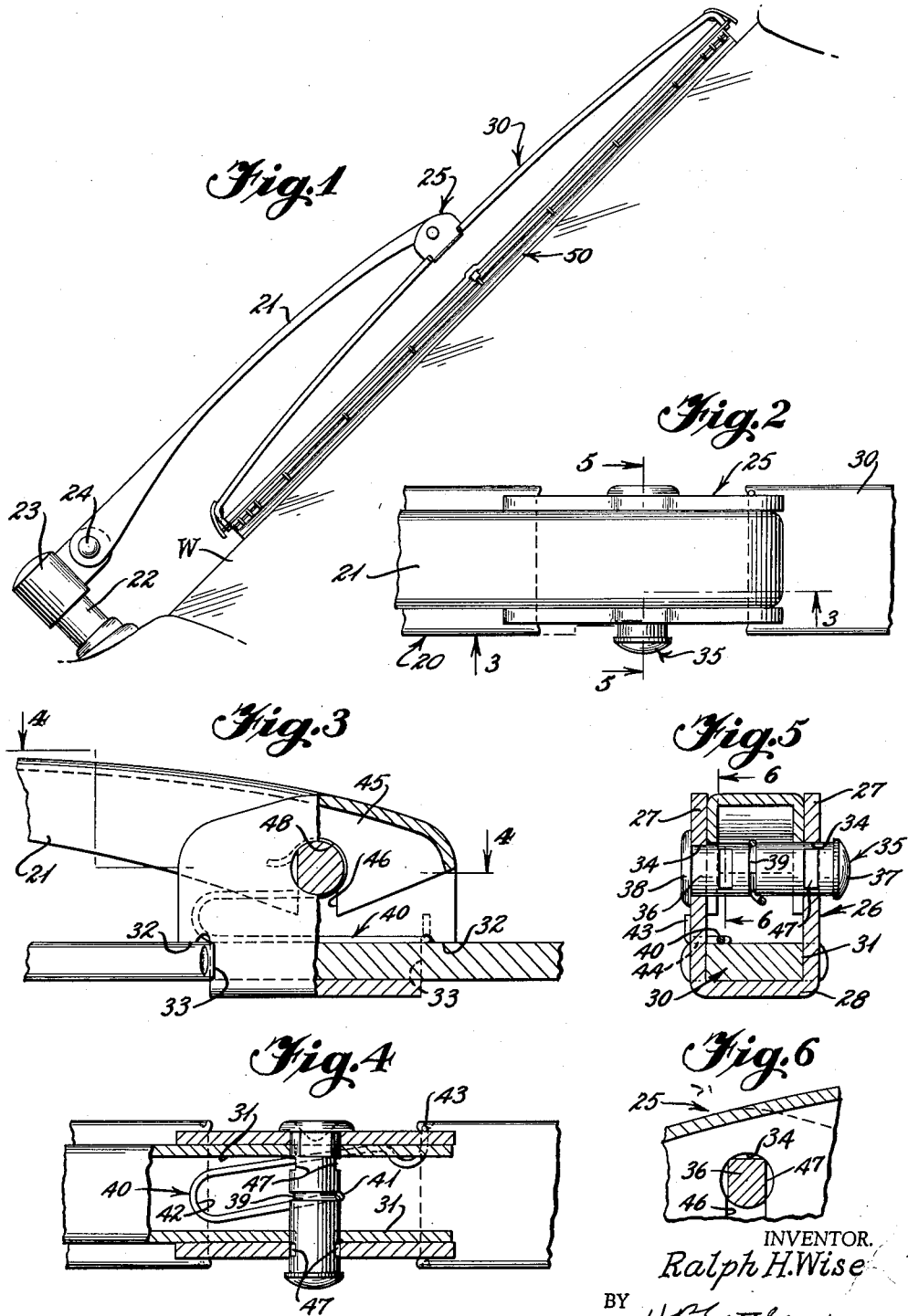

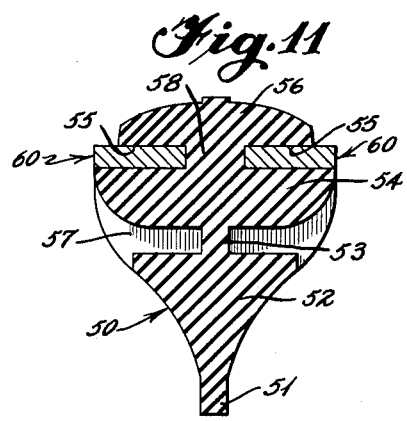
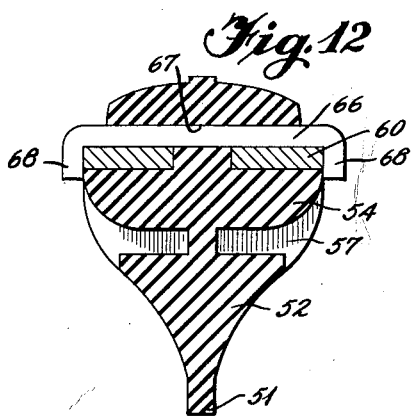
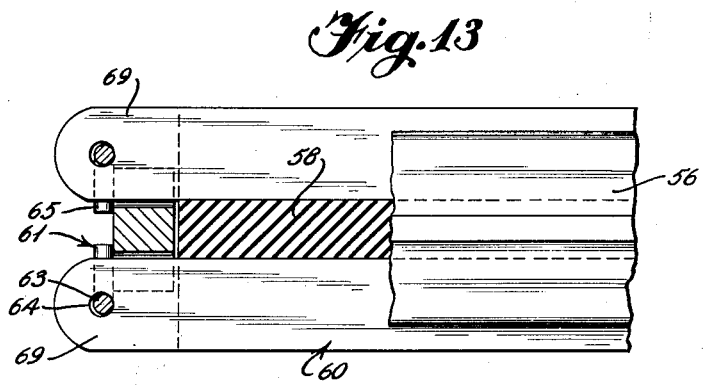
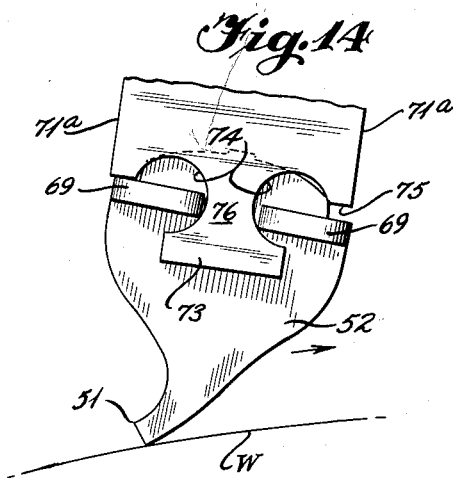
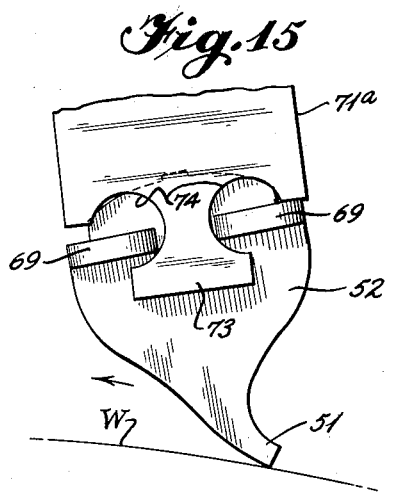

United States Patent Office 3,132,367
Patented May 12, 1964

3,132,367
WINDSHIELD WIPER
Ralph H. Wise, 211 N. Church St., Dyersburg, Tenn.
Filed Apr. 24, 1959, Ser. No. 808,668
3 Claims. (Cl. 15—250.42)

The present invention relates to a windshield wiper blade and to means for mounting the blade on an actuating arm for oscillation therewith.

Present automotive windshields are substantially curved, both transversely and vertically, to present a convex exterior surface which can best be wiped by a resilient rubber wiping edge. The prior art devices attempt to force the wiping edge against the windshield surface by compression loads imposed on spaced longitudinal portions of the wiping element by various forms of whiffletrees, linkages, springs or the like. These various compression loading structures are inherently incapable of applying to the wiping element a uniformly distributed load and further involve complicated structures including several moving parts constantly exposed to the weather. Additionally, these cumbersome loading structures are so heavy, bulky and expensive as to render impossible the adequate wiping of all the surface area of today's large automotive windshields. Consequently, large portions thereof, particularly at the upper or header molding portions, are not traversed by present blades, thus largely nullifying the additional visibility supposedly provided by the increased glass area.

The instant invention proposes a new approach to the problem of efficiently wiping a windshield surface of compound curvature. This new approach rejects the basic concept of applying compression through a linkage or a spring or the like and instead supports an unstressed wiping edge for free conformation to the windshield surface.

To support the wiping element, a torsion resistant spring steel carrier, deflectable from a planar configuration in a direction normal to the windshield surface and rigid in directions parallel to the windshield surface, carries the inherently resilient wiping element and is supported at its ends only, completely independently of the wiping element. The central portion of the carrier is subjected to a predetermined tensile load imposed thereon by a bow forming the primary structural element of the blade, the tensile loading normally maintaining the carrier in a single plane. The bow is stressed during assembly from its relaxed or stress-free condition, so as to subject the carrier to a constantly applied tensile stress, the magnitude of which varies in direct proportion to the degree of deflection of the carrier from its normal planar configuration.

In conforming to the windshield surface, the resiliently flexible, substantially unstressed wiping element flexes the tensioned carrier from its planar configuration during traversing of a curved windshield surface, and the resultant increase in the tensile stress imposed on the carrier is absorbed by increased flexure of the bow, since the carrier is of fixed length and the chordal distance between the bow-retained ends of the curved carrier is less than the arcuate distance therebetween. The tensile force exerted upon the carrier increases as the arc-to-chord ratio increases, and the resistance to further deflection also increases. The resultant increased reactive force against the surface being wiped must be transmitted through the wiping element and consequently the wiping edge thereof is urged against the surface under a force which increases with the increased curvature of the surface.

It is, therefore, an important object of this invention to provide an improved windshield wiper blade having a wiping edge capable of instant and accurate conformation to a curved windshield.

Another salient object resides in the provision of a windshield wiper blade in which a resiliently deflectible wiping element is supported against torsional deformation by a tensioned carrier.

It is a further important object to provide a windshield wiper blade in which a resilient wiping edge is urged against an arcuate windshield surface by the reaction to deflection of a carrier subject to a constantly applied tensile force, the force urging the edge against the surface being dependent primarily upon the contour of the surface and not upon an externally applied force.

It is a still further important object to provide a windshield wiper structure wherein a main structural element is connected to the ends only of a carrier bearing a wiping element, the structural element subjecting the carrier to a constantly applied tensile stress while the wiping element is substantially stress free the medial portions of the carrier being deflectible toward the structural element in order to conform to a curved windshield surface, the magnitude of the tensile stress in said carrier being directly proportional to the degree of deflection thereof and the wiping element-windshield contact force also being directly proportional to the degree of carrier deflection.

A further object resides in the provision of an improved arm-blade connector.

Other objects and advantages of the invention will appear from the following detailed description taken in conjunction with the annexed drawings, in which:

On the drawings:

FIGURE 1 is a somewhat schematic illustration of a windshield wiper of the present invention illustrated in wiping position upon an automotive windshield;

FIGURE 2 is an enlarged fragmentary plan view illustrating the connection of the wiper to an actuating arm;

FIGURE 3 is an enlarged sectional view taken along the planes 3—3 of FIGURE 2;

FIGURE 4 is a view taken along the planes 4—4 of FIGURE 3;

FIGURE 5 is a sectional view taken along the planes 5—5 of FIGURE 2;

FIGURE 6 is a fragmentary view taken along the planes 6—6 of FIGURE 5;

FIGURE 7 is an enlarged overall elevational view of the wiper;

FIGURE 8 is an enlarged fragmentary view illustrating a portion of the wiper of FIGURE 7;

FIGURE 9 is a fragmentary plan view similar to FIGURE 8;

FIGURE 10 is a fragmentary end view of the portion of the wiper illustrated in FIGURES 8 and 9;

FIGURE 11 is an enlarged sectional view taken along the planes 11—11 of FIGURE 8;

FIGURE 12 is an enlarged sectional view taken along the planes 12—12 of FIGURE 7;

FIGURE 13 is an enlarged sectional view taken along the planes 13—13 of FIGURE 8; and FIGURES 14 and 15 are somewhat schematic end views illustrating tilting of the wiping element during operation.

As shown on the drawings:

In FIGURE 1, reference numeral 20 refers generally to a windshield wiper of the present invention secured to an arm 21 for oscillation therewith about a pivot shaft 22 located generally beneath the windshield W. Oscillation of the pivot shaft 22 will cause concurrent and equivalent oscillation of the arm 21 and the wiper 20 across the windshield W by virtue of an arm socket 23 rotatable with the pivot shaft 22 and connected, as through a pivot pin 24, with the arm 21. Conventionally, a tension spring is utilized intermediate the socket 23 and the arm 21 to urge the arm 21 around the pivot pin 24 and against the windshield W. The wiper 20 and the arm 21 are interconnected by suitable means, as by a connector, indicated generally at 25, forming one of the features of the present invention.

The connection 25 preferably includes a U-shaped mounting saddle 26 (FIGURE 5) having upstanding legs 27 joined by a lower bight portion 28 underlying a main structural element or bow 30 of the wiper 20. The saddle legs 27 project upwardly from the bow 30 and the saddle 26 is fixedly secured to the bow 30 by suitable means. For example, the medial portion of the bow 30 is provided with a rectangular notch 31 at either transverse extremity and the bight portion 28 of the saddle 26 directly underlies this notch. The legs 27 are recessed at their lower extremities to provide a downwardly facing shoulder 32 which projects longitudinally outside the confines of the notch 31 to overlie the adjacent exposed upper surfaces of the bow 30 to aid in securing the saddle to the bow within the notch. The longitudinal extremities of the notch are peened or staked over the recessed portions of the saddle legs 27, as at 33. By this means, the saddle 26 is securely fixed to a medial portion of the bow 30.

The saddle legs 27 are provided with aligned circular apertures 34 receiving therethrough a securing pin, indicated generally at 35 and comprising a shank 36 having a radially enlarged head 37 at one end and a radially enlarged projection 38 at the other end. The locking pin 35 is provided with a central groove 39 within which is seated one end of a tension spring 40. The one end 41 of the spring 40 peripherally laps the pin 35 and is seated in the pin groove 39. A medial portion 42 of the spring 40 forms a reverse bend and the other end 43 of the spring is locked to the saddle by its projection through an aperture 44 formed in one of the saddle legs 27.

It will be seen that the function of the spring 40 is to urge the pin 35 in an axial direction such that the enlarged abutment 38 thereof abuts one of the saddle legs 27, the pin being displaceable against the bias of the spring 40 by manually engaging the enlarged head 37 and displacing the pin to the left, as viewed in FIGURE 5 (upwardly as viewed in FIGURES 2 and 4).

The arm 21 is preferably stamped of sheet steel stock or the like and is provided with a terminal end having parallel transversely spaced, depending flanges 45. These flanges 45 are spaced apart a distance slightly less than the space between the saddle legs 27 and, as best illustrated in FIGURES 4 and 5, fit snugly therebetween. The flanges 45 are each provided with a downwardly opening keyhole recess or slot 46, the lower width of which is less than the diameter of the pin 35. The pin 35 is provided with a pair of peripheral recesses adjacent each extremity thereof, the distance between the sets of recesses 47 being substantially the same as the transverse distance between the flanges 45. The radial distances between the bottoms of the peripheral recesses 47 is substantially the same as the width of the slots 46. The axial location of the recesses 47 along the length of the pin 35 is such that the pin 35 must be displaced axially against the bias of the spring 40 to bring the peripheral slots 47 into registry with the arm slots 46. Of course, the keyhole slots 46 communicate with upper circular portions 48 of the same diameter as the pin 36 (FIGURE 3) so that the pin can project through the portions when it is retracted by the bias of the spring 40 to its position illustrated in FIGURES 2, 4 and 5.

The slots 46 and 48 thus cooperate to define a keyhole aperture within which the pin will be seated but from which the pin cannot be removed until it is displaced axially.

As best shown in FIGURES 7 through 15 of the drawings, the actual wiping element 50 is formed of an elastomeric substance, preferably molded natural rubber, although suitable synthetic elastomers may be utilized. This wiping element 50 has a lower active wiping edge 51 of substantially reduced cross-section formed as the terminal or lower end of an upwardly and outwardly flaring deflectible portion 52. This deflectible portion 52 is connected through a reduced neck or hinge portion 53 with an upper transversely enlarged wiping element body portion 54 which is provided with radially outwardly opening slots 55 defined between the body portion 54 and an upper or top portion 56 which is transversely of less extent than the body portion 54 but which cooperates therewith to define the transversely outwardly opening slots 55.

During traversing movement of the wiper across a windshield surface, the edge 51 deflects laterally, both because of its own reduced cross-section and also because of the reduced neck or hinge portion 53, as best shown in FIGURES 11 and 12. To control such deflection, fillets or joining portions 57 are provided which merge smoothly with the body portion 54 above the neck 53 and the portion 52 below the neck 53. These fillets 57 are utilized to limit and/or otherwise control the deflection of the wiping edge 51 which occurs primarily about the neck 53. Uncontrolled deflection is most serious adjacent the longitudinal extremities of the wiper element 50 and the number of such fillets 57 preferably increase adjacent each longitudinal extremity of the wiping element to prevent the uncontrolled lateral deflection of these terminal portions of the wiper element. Additional supporting fillets 57 are provided intermediate the length of the blade. The number of fillets and their location is determined primarily by the length and deflection stability of the wiping element, and the "stiffness" or resistance to trailing deflection of the wiping edge 51 is controlled by these fillets.

The outwardly opening grooves 55 are provided to receive support strips or "carriers" 60. These carriers 60 support the elastomeric wiping element 50 against torsional deflection. The strips 60 are preferably formed of spring steel or the like and are substantially rectangular in outline with their longer dimensions lying transversely to the length of the wiping edge 51. These strips, per se, are resistant to torsional deflection and substantially resist deflection in a plane parallel to the direction of movement of the blade, i.e., a plane substantially parallel to the surface to be wiped by the blade. At the same time, the strips are quite thin in their transverse dimension and, because of their spring steel composition, are readily deflectible in a plane normal to the direction of movement of the blade, i.e., normal or perpendicular to the windshield surface to be traversed by the blade.

The strips 60 are seated in the grooves 55 and so support the body portion 54 of the wiping element 50 against torsional deflection, while leaving free the wiping edges 51 for trailing deflection about the hinge or neck 53, said deflection being controlled by the fillets 57, as heretofore explained.

As best illustrated in FIGURES 8–10, inclusive, and 13, the strips 60 are secured to one another for mutual retention within the slots 55 to lie on either side of the slot throat 58 by suitable extraneous securing means, preferably staples 61. This staple 61 comprises a bight portion 62 laterally bridging the distance between the two strips 60, down-turned legs 63 entered in vertical apertures 64 formed at the extremities 69 of the strips 60 and inturned terminal portions 65 which securely lock the strips in position.

It will be seen that the terminal staples 61 form the primary means interlocking the elastomeric wiping element 50 and the torsionally resistant strips or carriers 60. Additionally, these elements are maintained in assembly by the frictional engagement of the strips within the slots 55. If desirable, these elements may be further interlocked by the utilization of an interlocking strip illustrated in FIGURES 7 and 12 of the drawings and comprising merely a sheet metal clip 66 overlying the strips 60 and in contact with the upper surfaces thereof. The slot throat 58 is apertured, as at 67, to accommodate the passage of the clip 66 therethrough, and the elastomeric upper portion 56 of the element 50 is deformed locally to overlie the clip. The clip 66 is provided with down-turned locking edges 68 bearing against the exterior margins of the strips 60.

As heretofore explained, the main structural element of the wiper 20 is the bow 30 preferably formed of spring steel or the like and having a central arcuate portion 70 terminating at either end in terminal portions 71 deflected toward the wiping edge 51, i.e., toward the windshield as illustrated in FIGURE 1. Because of the spring steel nature of the bow 70 and the bow transition from the arcuate portion 30 which is of quite large radius of curvature to the down-turned terminal ends 71, the deflection of the integrally formed terminal ends 71 is quite difficult. This problem has been solved by drilling an aperture 72 at the transition point from the arcuate portion of the bow 70 to the deflected ends 71 thereof at either end of the flat stock prior to formation of the bow.

The down turned terminal ends 71, as shown in FIGURES 10, 14 and 15, are provided with reentrant recesses 74, having abutment sides or edges 75. Recesses 74 are positioned inwardly of edges 71a, and separated by a neck 76 and defined by a shoulder portion 73. Action of the wiper element 50 causes torsional movement of carrier strips 60. However, this movement is limited by the sides 75 of recesses 74 abutting the strips 60. Consequently, the amount of material at the transition point is substantially reduced and sharp deflection of the terminal ends becomes feasible. Additionally, after the arcuate bow 70 has been formed, the size of the aperture, and the presence of the aperture per se, has a marked effect upon the tensile characteristics of the bow, as will be hereinafter explained.

Also, while the strip stock from the bow 70 is being formed in its initial flat condition, the ends of the bow stock are stamped or otherwise formed to provide a reduced extremity 73 joined to the down-turned terminal portions 71 through arcuate recesses 74 set inwardly from each lateral extremity 71a of the bow and joined thereto through a transverse, planar abutment surface 75. The arcuate surfaces 74 cooperate with the reduced end 73 to form reentrant slots at the extremity of each of the bow ends 71 which slots are adapted to receive the terminal ends 69 of the carriers or strips 60. These strip ends 69 are spaced apart through a distance substantially equal to the throat portion 58 of the wiping element body 54 and the arcuate recesses 74 are spaced apart through a throat dimension 76 which is less than the dimension of the throat 58. The transverse dimension of the reduced end 73 is larger than the corresponding dimension of the throat 58 to prevent displacement of the assembled wiping element 50 and strips 60 from the arcuate recesses 74.

During assembly, the assembly technique which is preferably employed involves the stapling together, as by fasteners 61, of one end of a pair of the strips 60, the assembly of the strips and the wiping element 50 by the insertion of the strips in the wiping element grooves 55 after one terminal end 71 of the bow has been inserted between the assembled ends 66 of the strips, the one end of the bow bearing against the one staple initially inserted.

Next, the other bow end is inserted endwise between the strips 60, the bow 30 is preferably flexed slightly and held flexed while the other staple 61 is utilized to complete the assembly of the bow 30, the rubber 50 and the strips 60. It will be appreciated that any variations of this assembly technique may be utilized and the technique is described herein merely in its preferred form and to illustrate one manner of assembly which can be utilized so that the assembly takes place with the bow 30 under stress, i.e., with the bow terminal end 71 spaced apart a longitudinal distance less than the relaxed distance of the bow as formed.

As a result of the initial placing of the bow 30 under stress and the assembly while this stress is maintained, the strips 60 are placed under an initial tensile stress. The staples 61 maintain the bow under such stress. However, the rubber 50 is not placed under any substantial initial stress other than that resulting from its frictional contact with the strips 60 and the magnitude of any such stress, whether during initial assembly or during operation, can never exceed the magnitude of the friction forces between these elements. Consequently, the rubber may be defined as "substantially unstressed" since it is, for all practical purposes, under no tensile strain and certainly under a tensile strain of such low magnitude as to be incapable of effecting any appreciable deformation thereof.

While preferred embodiments have been described above in detail, it will be understood that numerous modifications might be resorted to without departing from the scope of the invention as defined in the following claims.

What is claimed is:

1. In a wiper for a convex surface,
    an elongated resiliently deformable wiping element having a wiping edge, and with longitudinally extending slots spaced from said edge and extending parallel thereto,
    a non-extensible carrier strip frictionally seated in each said slots and projecting beyond the ends of said element,
    a main carrier structure of elongated configuration and having end elements pivotally secured to the ends of said non-extensible carriers and effective to tension the same,
    and means on said end elements engageable with said non-extensible carriers to provide limited torsional turning of said wiping element as the edge thereof is moved along said convex surface.

2. In a windshield wiper wherein a wiping element having a reduced wiping edge contactible with a curved windshield surface is supported against limited torsional deflection and for curved conformation to said curved surface by a pair of non-extensible carrier strips having said wiping element interposed therebetween, said strips each being flexible in a plane normal to the surface and rigid in planes parallel to the surface, bow means having end portions directed toward the windshield surface joined by a medial portion, said end portions each having outwardly opening recesses therein freely receiving the carrier strips and means interconnecting the adjacent end portions, respectively, of said strips and said carrier strips abutting said recesses of said bow means on action by said wiping edge, and said carrier strips being tensionally stressed by said bow means.

3. In a windshield wiper, a wiping element having a reduced wiping edge contactible with a curved windshield surface and supported against limited torsional deflection and for curved conformation to said curved surface by a pair of spaced carrier strips flexible in a plane normal to the surface and rigid in planes parallel to the surface, support means in the form of a bow having end portions directed toward the windshield surface joined by an arcuate medial portion, and securing means interconnecting the end portions of said carrier strips only, the end portions of said bow having opposing reentrant recesses in which said carrier strips are freely positioned for limited movement and the sides of the recesses abutting the carrier strips on torsional movement of the wiping element, and said wiping element being stress-free and said carrier strip being tensionally stressed by said bow means confined against said securing means.

(References on following page)

References Cited in the file of this patent

UNITED STATES PATENTS

| | | |
|---|---|---|
| 2,091,928 | Horton | Aug. 31, 1937 |
| 2,543,383 | Scinta et al. | Feb. 27, 1951 |
| 2,601,664 | Nesson | June 24, 1952 |
| 2,658,223 | Enochian | Nov. 10, 1953 |
| 2,659,097 | Morton | Nov. 17, 1953 |
| 2,712,146 | Wise | July 5, 1955 |
| 2,798,244 | Nesson | July 9, 1957 |

FOREIGN PATENTS

| | | |
|---|---|---|
| 755,120 | Great Britain | Aug. 15, 1956 |
| 935,297 | Germany | Nov. 17, 1955 |
| 936,553 | Germany | Dec. 15, 1956 |
| 1,045,263 | Germany | Nov. 27, 1958 |